Patented May 17, 1932

1,859,255

UNITED STATES PATENT OFFICE

WILHELM MOSER, OF RIEHEN, NEAR BASEL, SWITZERLAND, ASSIGNOR TO THE FIRM OF SOCIETY OF CHEMICAL INDUSTRY IN BASLE, OF BASEL, SWITZERLAND

MANUFACTURE OF A DYESTUFF OF THE ANTHRAQUINONE SERIES

No Drawing. Application filed November 28, 1930, Serial No. 498,913, and in Switzerland December 4, 1929.

In U. S. Patent No. 1,044,797 or in British specifications No. 20,094 of 1908 or No. 11,422 of 1911 there is described the production of a vat-dyestuff dyeing blue-green by sulfurizing 2-methyl-benzanthrone or a derivative thereof. According to the processes disclosed in said specifications the product is obtained in a satisfactorily pure condition.

It has now been found that this dyestuff which corresponds very probably to the formula

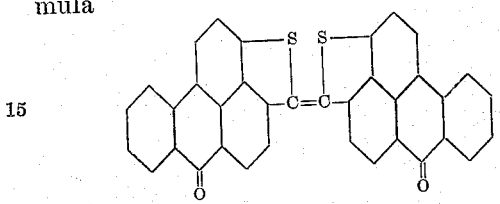

can be converted into an essentially more valuable product of a high degree of purity by dissolving it in sulfuric acid and diluting this solution cautiously with water, so as to precipitate the dyestuff, but to retain the impurities in the solution. This is attained by diluting the sulfuric acid to about 90 per cent. strength.

The following example illustrates the invention, the parts being by weight:—

*Example*

20 parts of the dyestuff made as described in the example of British specification No. 11,422 of 1911 or of U. S. specification No. 1,044,797 are dissolved, while stirring, in the cold in 200 parts of sulfuric acid of 100 per cent. strength. To the solution thus obtained 10–20 parts of water are added gradually, drop by drop, care being taken that the temperature does not rise too high. The dyestuff thus separated in a fine form is filtered and washed with a sulfuric acid solution of the same concentration as that in which the precipitate has been formed and then with water, after which the product is dried. This new dyestuff is a dark powder with a metallic lustre. It dissolves in sulfuric acid to a wine red solution; its vat is violet blue and dyes cotton fast blue-green tints which are essentially more pure and somewhat bluer than those obtainable by means of the parent material.

The sulfuric acid solution can be diluted with dilute sulfuric acid or by means of water vapor (for instance in the form of air saturated with water vapor).

What I claim is:—

A manufacture of a dyestuff of the anthraquinone series of a high degree of purity by dissolving the blue-green dyestuff described in Patent No. 1,044,797, and corresponding very probably to the formula

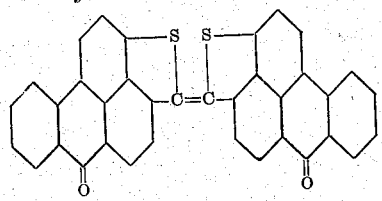

in sulfuric acid and diluting the sulfuric acid solution thus obtained with so much water that the resulting solution has the strength of about 90 per cent., the dyestuff being thus precipitated while the impurities still remain dissolved.

In witness whereof I have hereunto signed my name this 17th day of November, 1930.

WILHELM MOSER.